Nov. 29, 1960 C. O. BERG ET AL 2,962,626

DEFLECTION SYSTEM FOR A CATHODE RAY TUBE

Filed Aug. 18, 1959 2 Sheets-Sheet 1

INVENTORS
DONALD R. TAYLOR, JR.
CARL O. BERG

BY Fordyce A. Bothwell

ATTORNEY

INVENTORS
DONALD R. TAYLOR, JR.
CARL O. BERG
BY
Fordyce A. Bothwell
ATTORNEY 2,962,626

DEFLECTION SYSTEM FOR A CATHODE RAY TUBE

Carl O. Berg, Camden, N.J., and Donald R. Taylor, Jr., Philadelphia, Pa., assignors to Philco Corporation, Philadelphia, Pa., a corporation of Pennsylvania Filed Aug. 18, 1959, Ser. No. 834,586
12 Claims. (Cl. 315—27)

This invention relates to deflection systems for cathode ray tubes and more particularly to such systems employing a transistor which is turned on and off in the course of each operating cycle.

As is well understood by those skilled in the art, electron beam deflection in a cathode ray tube, such as the image-reproducing tube of a television receiver, is effected by supplying to the deflection yoke a sawtooth deflection current having trace and retrace portions. Such a deflection current may be produced by means of a circuit combination comprising a transistor, a damper diode and a capacitor all of which contribute to form each complete cycle of the sawtooth current. In this known combination the turn-off of the transistor terminates the trace portion of the cycle and initiates the retrace portion. Moreover, as hereinafter more fully discussed, the turn-off of the transistor is the critical control function in this type of system. However, due to the inherent storage characteristic of a transistor it tends to remain on for a short time after the turn-off function has been performed, thus tending undesirably to delay the start of retrace.

This objection can be overcome by strongly back-biasing the transistor at the time of desired turn-off and by maintaining the strong back bias throughout the retrace interval. However, the rapid turn-off of the transistor thus effected requires only a small part of the retrace time and therefore the strong back bias is not required during the remainder of the retrace time. Hence, it is wasteful of energy to maintain the strong back bias during the entire retrace time. On the other hand, the application of the bias to the transistor during only part of the retrace time presents a problem in respect to generation of the required waveform.

The principal object of the present invention is to provide a satisfactory solution of this problem.

Another object of the invention is to provide a simple and effective means for applying a strong back bias to the transistor for a time less than the retrace time and sufficient only to effect rapid turn-off of the transistor.

In the preferred embodiment, this invention utilizes inherent properties of a transformer to supply the desired bias to the transistor during the first part of the retrace time. The transformer serves to couple a flyback driving stage to the output stage including the transistor whose turn off is critical. The transistor, in being turned on and off, effects simulation of short-circuit and open-circuit conditions of the transformer secondary. This in turn causes the flyback driving stage to supply the desired bias to the transistor in the output stage.

Figure 1:
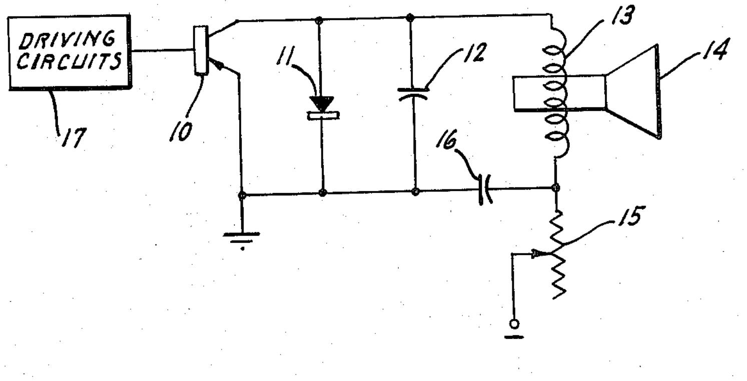
FIG. 1 PRIOR ART
Figure 3:
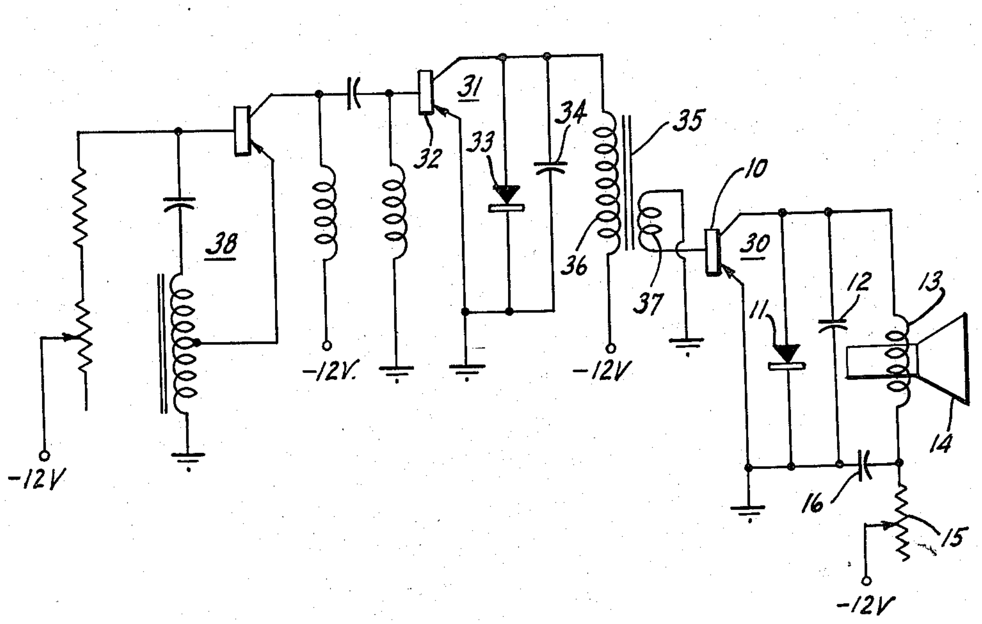
Figure 2:
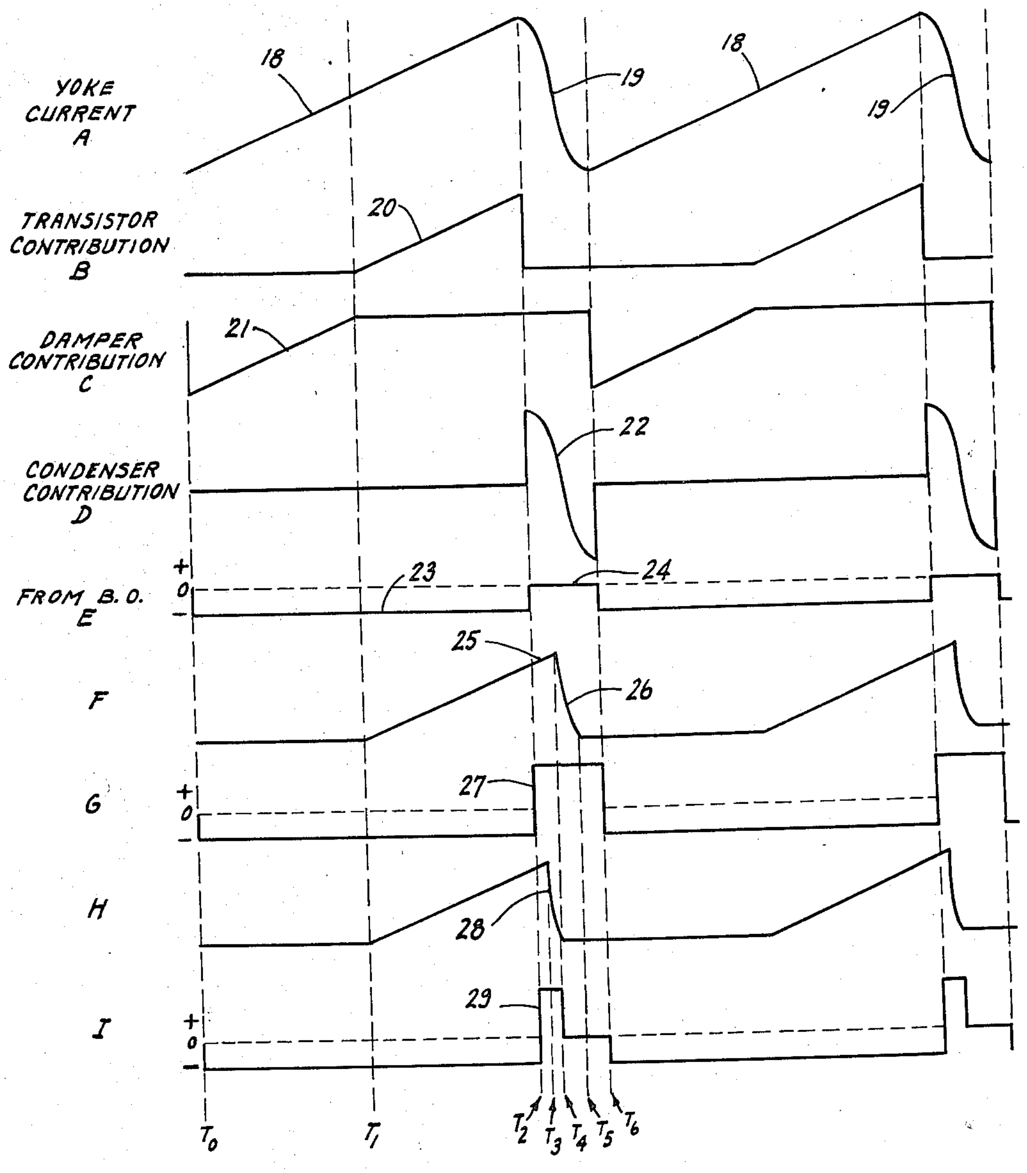

The invention may be fully understood from the following detailed description with reference to the accompanying drawings wherein Fig. 1 is a diagrammatic illustration of a known form of deflection system to which the present invention is applicable;

Fig. 2 shows various waveforms to enable a clear understanding of the invention; and Fig. 3 is a diagrammatic illustration of a deflection system embodying the preferred form of this invention.

Referring first to Fig. 1, the system there shown comprises a transistor 10, a damper diode 11 and a capacitor 12 all in parallel, which serve cooperatively to produce a sawtooth deflection current in the deflection coil 13 which is part of the deflection yoke of the cathode ray tube 14. The transistor, which by way of example is shown as being of the P-N-P type, has its emitter grounded and has its collector connected to a source of negative voltage through coil 13 and variable resistor 15. A capacitor 16 provides low A.C. impedance for the yoke current and also prevents application of the negative voltage to the emitter. Block 17 represents the driving circuits for driving the transistor 10.

Reference is now made to Fig. 2 wherein various waveforms are shown on the same time scale. In one cycle the time interval $t_0$–$t_2$ is the trace time, while the time interval $t_2$–$t_6$ is the retrace time. There is shown at A the sawtooth deflection current which it is desired to produce in the deflection coil and which comprises trace portions 18 and retrace portions 19. The sawtooth deflection current is a composite of three individual currents whose waveforms are shown at B, C and D. Waveform B represents the collector current of the driven transistor; waveform C represents the current which flows through the associated damper diode; and waveform D represents the current which flows through the associated capacitor. These three currents flow through the deflection coil and produce therein the composite deflection current A.

In this type of system represented in Fig. 1, it is only necessary that the transistor turn on at time $t_1$ and off at time $t_2$. Then the complete cycle occurs automatically. The damper diode conducts during interval $t_0$–$t_1$, and the transistor conducts during interval $t_1$–$t_2$. Portions 20 and 21 of waveforms B and C produce the trace portion 18 of the deflection current A. The flyback action produces portion 22 of waveform D which provides the retrace portion 19 of the deflection current waveform A.

The system will operate cyclically in response to an applied voltage having the waveform represented at E. With this waveform a negative voltage 23 is applied to the base of the driven transistor during interval $t_0$–$t_2$, but the transistor does not turn on until time $t_1$ when it is permitted to do so by the damper diode. With the transistor turned on, the rise of the collector current is determined by the inductance and resistance of the deflection coil. With these parameters properly selected, the collector current is caused to increase gradually as represented at 20.

At time $t_2$ the driving voltage E goes to zero as represented at 24 to turn the transistor off, but due to hole storage in the transistor (it being assumed to be of the P-N-P type) it continues to conduct to time $t_4$ as shown at 25 in waveform F which shows the actual operation of the transistor. Then the transistor turns off during the interval $t_4$–$t_5$ as shown at 26. This delay of turn-off could be overcome by applying a strong back bias to the transistor during the retrace time as represented at 27 in waveform G which would replace waveform E. However, this is undesirable because it is wasteful of energy. With the strong back bias applied at time $t_2$, the transistor turn off action becomes that depicted at 28 in waveform H. The transistor now ceases to conduct at time $t_3$ and it is completely cut off at time $t_4$. Then the back bias is no longer required. Accordingly, the ideal driving voltage waveform is that shown at I which provides the strong back bias 29 only during the first part of the retrace time when it is needed. However, the generation of the waveform I presents a problem.

Referring now to Fig. 3, there is shown a deflection system embodying the preferred form of the present invention wherein a simple arrangement is provided for producing the waveform I and for driving the output transistor accordingly. In the system shown, the output stage 30 corresponds to that of Fig. 1 and the elements are designated by the same reference characters. Ahead of the output stage is a flyback driving stage 31 including a transistor 32, a damper diode 33 and a capacitor 34 in shunt relation to one another. The driving stage also includes a transformer 35, having a primary winding 36 and a secondary winding 37, which serves to couple the driving stage to the output stage and is instrumental in the production of the waveform I of Fig. 2 as presently to be described. A conventional blocking oscillator 38 supplies the voltage waveform E of Fig. 2 to the driving stage 31, and the latter produces the waveform I.

The operation of the driving stage 31 may be readily understood by reference to the operation of the well known flyback system employed in the conventional horizontal deflection system of a television receiver. In such a system the duration of the flyback pulse is determined solely by the inductance and capacitance, the flyback pulse being a half cycle of a sinewave at the resonant frequency of the system. Now in the driving stage 31 of the present system the transformer 35 furnishes the inductance and the operation involves two resonant frequencies as will now be explained.

When the transistor 10 is turned on it presents a low impedance to the secondary 37, simulating a short circuit condition of the secondary. At such time the effective inductance of the transformer is the leakage inductance which is small. On the other hand, when the transistor 10 is turned off it presents high impedance to the secondary 37, simulating an open circuit condition of the secondary. At such time the effective inductance of the transformer is the inductance of the primary which is high. Consequently, during the retrace time $t_2$–$t_6$ (Fig. 2) two flyback frequencies are involved—a higher frequency when transistor 32 is turned off and transistor 10 is still turned on, time $t_2$–$t_3$, and a lower frequency when transistor 32 is turned off and transistor 10 is turned off, time $t_3$–$t_6$.

During the time $t_0$–$t_2$, transistor 32 or diode 33 is made to conduct thereby connecting the primary of transformer 35 across the 12 v. supply. This will allow energy to be stored in both the magnetizing inductance and leakage inductance of transformer 35. Transistor 10 is also turned on during this period of time because of the transformer polarity, thereby placing a fairly low impedance across the secondary winding 37. At time $t_2$ transistor 32 is turned off. The energy which was stored in both the magnetizing and the leakage inductances of transformer 35 will now be transferred to capacitor 34. The resonant frequency of oscillations will be fairly high because the leakage inductance of transformer 35 is shunted in parallel with the magnetizing inductance through the low impedance of the output transistor 10. The circuit will ring in this high frequency mode for a period a little greater than ¼ of its natural period. This can be seen by noting the following. During the time $t_0$–$t_2$ the magnetizing inductance of the transformer 35 has been connected across the 12 v. supply thereby storing energy in its magnetic field. The leakage inductance of transformer 35 has also been storing energy by virtue of the base current flowing which turns transistor 10 full on. At time $t_2$ transistor 32 is made non-conducting, and current which was flowing in the leakage inductance will continue to flow in the same direction as when transistor 32 was conducting but as a ringing current. For the first quarter cycle it will flow through the forward conduction resistance of transistor 10. At the end of a quarter cycle, the current will be zero and then will reverse itself. Transistor 10, being in saturation, will continue to conduct a heavy collector current even though the base current goes to zero. The capacitor 34 in the meantime has a large voltage impressed on it due to the exchange of stored energies. At approximately time $t_3$ the base current reverses or flows in the direction opposite to the forward conduction path of transistor 10. Due to slow recovery time of the base-emitter diode junction of transistor 10, the base current will flow in this reverse direction until the input impedance of transistor 10 recovers to a large value and thereby indicates the turn off of transistor 10. The resonant frequency of the drive waveform will be lowered due to the removal of the leakage inductance when the input of transistor 10 becomes very large. The magnitude of the impressed voltage waveform will also be reduced during this period, $t_4$ to $t_6$.

By reason of the foregoing, the driving stage 31 is able to produce the waveform I of Fig. 2. The requirements for this are that the ratio of leakage inductance to primary inductance of the transformer 35 be the same as the square of the ratio of time interval $t_2$–$t_4$ to the time interval $t_4$–$t_6$, and that the capacitance of capacitor 34 be such that it will resonate with the leakage inductance at a frequency whose ¼ period is equal to the interval $t_2$–$t_4$, and will also resonate with the full primary inductance at a frequency whose ¼ period is equal to the time interval $t_4$–$t_6$.

Considering now the opertion of the driver stage 31 in the light of the foregoing discussion and with reference to Fig. 2, during the time $t_1$–$t_2$ when transistor 10 is turned on, the effective inductance of transformer 35 is small and a large amount of energy is stored therein. At time $t_2$ a large-amplitude high-frequency flyback pulse is initiated in the driver stage, which strongly back biases transistor 10 and causes rapid turn-off thereof as depicted at 28 in waveform H of Fig. 2. The turn-off of transistor 10 at time $t_4$ causes the effective inductance of transformer 35 to increase to a relatively large value, and consequently the flyback pulse in the driver stage changes to lower amplitude and lower frequency, with the result that the strong back bias on transistor 10 is effectively removed. Thus the two-frequency flyback driver stage produces the waveform I of Fig. 2 and controls the output transistor 10 accordingly.

In one physical embodiment which has been employed successfully to drive the output transistor in the desired manner, the components of the driver stage are as follows.

| | |
|---|---|
| Transistor 32 | AR-2. |
| Damper diode 33 | 1N91. |
| Capacitor 34 | .0047 microfarad. |
| Primary 36 | 1.5 millihenrys—150 turns. |
| Secondary 37 | 15 turns. |

While a preferred embodiment of the invention has been illustrated and described, it is to be understood that the invention is not limited thereto but contemplates such modifications and further embodiments as may occur to those skilled in the art.

We claim:

1. In a deflection system for a cathode ray tube; a deflection yoke including a coil in which it is necessary to produce a sawtooth deflection current each cycle of which involves trace and retrace times; means for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; a stage for driving said transistor in response to a driving signal; means for supplying the driving signal to said stage; and means in said said stage for applying a strong back bias to said transistor during a portion only of said retrace time to effect rapid turn-off of the transistor.

2. In a deflection system for a cathode ray tube; a deflection yoke including a coil in which it is necessary to produce a sawtooth deflection current each cycle of which involves trace and retrace times; a transistor, a damper diode and a capacitor all connected in parallel relation across said coil to produce cooperatively the sawtooth current in said coil in response to switching on and off of said transistor, said transistor tending to be delayed in its turn-off due to its storage characteristic which thus tends adversely to affect the sawtooth deflection current; a stage for driving said transistor in response to a driving signal; means for supplying the driving signal to said stage; and means in said stage for applying a strong back bias to said transistor during a portion only of said retrace time to effect rapid turn-off of the transistor.

3. In a deflection system for a cathode ray tube; a deflection yoke including a coil in which it is necessary to produce a sawtooth deflection current each cycle of which involves trace and retrace times; means for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor in response to a driving signal, said stage including a capacitor and a transformer coupling said stage to said transistor, said transformer having leakage and primary inductances and said capacitor having a capacitance such that said capacitor will resonate with said leakage inductance at a relatively high frequency while said transistor is still on and said capacitor will also resonate with said primary inductance at a lower frequency when said transistor turns off, whereby a strong back bias is applied to said transistor during a portion only of said retrace time to effect rapid turn-off of the transistor.

4. A deflection system according to claim 3, wherein said driving stage includes a transistor, a damper diode and said capacitor all in shunt relation to one another.

5. In a deflection system for a cathode ray tube; a deflection yoke including a coil in which it is necessary to produce a sawtooth deflection current each cycle of which involves trace and retrace times; means for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor in response to a driving signal, said stage including a capacitor and a transformer coupling said stage to said transistor, said transformer having leakage and primary inductances and said capacitor having a capacitance such that said capacitor will resonate with said leakage inductance at a relatively high frequency whose ¼ period is substantially equal to a first relatively short time interval within said retrace time while said transistor is still on and said capacitor will also resonate with said primary inductance at a lower frequency whose ¼ period is substantially equal to a second relatively longer time interval within said retrace time while said transistor is off, whereby a strong back bias is applied to said transistor during a portion only of said retrace time to effect rapid turn-off of the transistor.

6. In a deflection system for a cathode ray tube; a deflection yoke including a coil in which it is necessary to produce a sawtooth deflection current each cycle of which involves trace and retrace times; means for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor in response to a driving signal, said stage including a shunt capacitor and a transformer coupling said stage to said transistor, said transformer having leakage and primary inductances such that the ratio of its leakage inductance to its primary inductance is substantially equal to the square of the ratio of a first to a second time interval within said retrace time during which respective time intervals said transistor is on and off, and said capacitor having a capacitance such that it will resonate with said leakage inductance at a frequency whose ¼ period is substantially equal to said first time interval, and it will also resonate with said primary inductance at a frequency whose ¼ period is substantially equal to said second time interval, whereby a strong back bias is applied to said transistor during a portion only of said retrace time to effect rapid turn-off of the transistor.

7. A deflection system according to claim 6, wherein said driving stage includes a transistor, a damper diode and said capacitor all in shunt relation to one another.

8. In a deflection system for a cathode ray tube; a deflection yoke including a coil in which it is necessary to produce a sawtooth deflection current each cycle of which involves trace and retrace times; a flyback output stage for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor, said driving stage including a capacitor and a transformer coupling said driving stage to said transistor, said transformer having leakage and primary inductances and said capacitor having a capacitance such that said capacitor will resonate with said leakage inductance at a relatively high frequency while said transistor is still on and said capacitor will also resonate with said primary inductance at a lower frequency when said transistor turns off, whereby a strong back bias is applied to said transistor during a portion only of said retrace time to effect rapid turn-off of the transistor.

9. A deflection system according to claim 8, wherein said driving stage includes a transistor, a damper diode and said capacitor all in shunt relation to one another.

10. In a deflection system for a cathode ray tube; a deflection yoke including a coil in which it is necessary to produce a sawtooth deflection current each cycle of which involves trace and retrace times; a flyback output stage for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor, said driving stage including a capacitor and a transformer coupling said driving stage to said transistor, said transformer having leakage and primary inductances and said capacitor having a capacitance such that said capacitor will resonate with said leakage inductance at a relatively high frequency whose ¼ period is substantially equal to a first relatively short time interval within said retrace time while said transistor is still on and said capacitor will also resonate with said primary inductance at a lower frequency whose ¼ period is substantially equal to a second relatively longer time interval within said retrace time while said transistor is off, whereby a strong back bias is applied to said transistor during a portion only of said retrace time to effect rapid turn-off of the transistor.

11. In a deflection system for a cathode ray tube; a deflection yoke including a coil in which it is necessary to produce a sawtooth deflection current each cycle of which involves trace and retrace times; a flyback output stage for producing said deflection current including a transistor which is turned on during at least the later part of the trace time and which is turned off to terminate trace and to initiate retrace, said transistor tending to be delayed in its turn-off due to its storage characteristic which thus tends adversely to affect the sawtooth deflection current; and a flyback stage for driving said transistor, said driving stage including a capacitor and a transformer coupling said driving stage to said transistor, said transformer having leakage and primary inductances such that the ratio of its leakage inductance to its primary inductance is substantially equal to the square of the ratio of a first to a second time interval within said retrace time during which respective time intervals said transistor is on and off, and said capacitor having a capacitance such that it will resonate with said leakage inductance at a frequency whose ¼ period is substantially equal to said first time interval, and it will also resonate with said primary inductance at a frequency whose ¼ period is substantially equal to said second time interval, whereby a strong back bias is applied to said transistor during a portion only of said retrace time to effect rapid turn-off of the transistor.

12. A deflection system according to claim 11, wherein said driving stage includes a transistor, a damper diode and said capacitor all in shunt relation to one another.

References Cited in the file of this patent

UNITED STATES PATENTS 2,896,114 Maloff ---------------- July 21, 1959

OTHER REFERENCES

Herzog et al.: "Transistorized Portable Receiver," Radio-Electronics, January 1955, pages 43 to 45.